US008103459B2

(12) United States Patent
Barten et al.

(10) Patent No.: US 8,103,459 B2
(45) Date of Patent: Jan. 24, 2012

(54) SAFETY CLOTHING

(75) Inventors: Stefan Barten, Lübeck (DE); Markus Wansing, Lübeck (DE); Volker Kuhn, Stockelsdorf (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 407 days.

(21) Appl. No.: 12/415,076

(22) Filed: Mar. 31, 2009

(65) Prior Publication Data

US 2009/0287425 A1 Nov. 19, 2009

(30) Foreign Application Priority Data

May 15, 2008 (DE) ........................ 10 2008 023 523

(51) Int. Cl.
*G01N 7/00* (2006.01)

(52) U.S. Cl. ........................................................ 702/24

(58) Field of Classification Search ..................... 702/24
See application file for complete search history.

(56) References Cited

U.S. PATENT DOCUMENTS

| | | | |
|---|---|---|---|
| 3,902,485 | A | 9/1975 | Wallace |
| 5,151,678 | A | 9/1992 | Veltri et al. |
| 5,327,587 | A | 7/1994 | Hurwitz |

FOREIGN PATENT DOCUMENTS

| | | | |
|---|---|---|---|
| CA | 2016041 | A1 | 1/1991 |
| DE | 88 14 564 | U1 | 2/1989 |
| DE | 89 09 111 | U1 | 8/1990 |
| DE | 199 64 188 | B4 | 6/2001 |
| DE | 101 40 945 | A1 | 3/2003 |
| DE | 102005045272 | A1 | 4/2007 |
| DE | 202008000796 | U1 | 3/2008 |
| EP | 0066472 | A1 | 12/1982 |
| EP | 0166534 | A1 | 1/1986 |
| GB | 2054156 | A | 2/1981 |
| WO | WO 03/097261 | A1 | 11/2003 |
| WO | WO2005/020731 | A | 3/2005 |

*Primary Examiner* — Tung S Lau

(74) *Attorney, Agent, or Firm* — McGlew and Tuttle, P.C.

(57) ABSTRACT

Safety clothing (1) for persons in dangerous situations is provided including at least one device (3) for generating light and/or at least one device for generating sound and/or at least one mechanical device for generating a warning stimulus, which is perceptible by the person, an interface (5) for generating data or signals with a gas-measuring device (12) and a power supply device (9) for supplying the at least one device (3) and/or the interface with power. The features are in functional connection with one another, for optically and/or acoustically and/or mechanically warning the person when at least one limit value of a harmful gas is exceeded or in case of at least one implausible measured value of the air detected by the gas-measuring device (12).

16 Claims, 3 Drawing Sheets

SAFETY CLOTHING

CROSS REFERENCE TO RELATED APPLICATIONS

This application claims the benefit of priority under 35 U.S.C. §119 of German Patent Application DE 10 2008 023 523.7 filed May 15, 2008, the entire contents of which are incorporated herein by reference.

FIELD OF THE INVENTION

The present invention pertains to a safety clothing for persons in dangerous situations.

BACKGROUND OF THE INVENTION

Firemen and rescue teams must perform activities under very difficult environmental conditions in fires or other dangerous situations. Harmful gases, e.g., toxic or explosive gases, may be present in the breathing air. It is known in this connection that the concentration of the harmful gases in the breathing air can be determined by means of a gas-measuring device and the person can be warned when limit values of the harmful gas are exceeded in the dangerous situation.

Firemen and rescue teams are subject to overstimulation and considerable physical as well as psychological stress during the dangerous situations. Weak warning signals or warning signals that are difficult to recognize are therefore usually not perceived by the rescue teams. For example, simple warning lights on stationary or portable gas-measuring devices are, in general, not sufficient, because the warning lights cannot be recognized any longer even at a short distance, especially in case of low visibility due to the intense generation of smoke. Acoustic warning means are not detected any longer because of high noise levels, either.

DE 10 2005 045 272 B4 and DE 101 40 945 B4 show gas-measuring devices for detecting harmful gases in the air. In general, a gas-measuring device with one or more sensors, which are provided for measuring the expected gas concentration and whose measuring sensitivity is selected correspondingly, is used to measure a gas sample. The gas-measuring device has, as a rule, an analysis unit, which analyzes the measured signals of the sensors. The analysis unit checks whether the measured signals exceed a previously defined and preset limit value. In case the limit value is possibly exceeded or in case of implausible measured values, the user is usually warned optically, mechanical or acoustically.

Portable gas-measuring devices are carried by users or the person in dangerous situations as personal monitoring devices in order to rapidly detect harmful gases in the working area and to warn the user. Based on the mobility of the portable gas-measuring device, the gas-measuring device must have the most compact housing dimensions possible. This means that only a limited surface is available for generating warning stimuli, especially in case of an optical alarm by means of light, so that the user cannot, in general, perceive the warning stimulus under difficult environmental conditions.

Stationary and quasistationary gas-measuring devices have a longer operating time due to better power supply. The housing dimensions are of secondary importance. In contrast, there is, in general, no possibility for individually alarming the user.

SUMMARY OF THE INVENTION

An object of the present invention is therefore to provide safety clothing with a warning surface, which can generate reliably perceptible warning signals even under difficult environmental conditions in dangerous situations. The safety clothing shall, furthermore, be able to be handled in a simple manner and be reliable and have low manufacturing costs.

This object is accomplished with safety clothing for persons in dangerous situations, comprising at least one warning device or means for generating a personal warning signal such as a means for generating light and/or at least a means for generating sound and/or at least one mechanical means for generating a warning stimulus, which is perceptible by the person; an interface for exchanging data or signals with a gas-measuring device, and a power supply means for supplying with power the at least one means for generating light and/or the at least one means for generating sound and/or the at least one mechanical means and/or the interface, which are in functional connection with one another for optically and/or acoustically and/or mechanically warning the person when at least one limit value of at least one harmful gas is exceeded or in case of at least one implausible measured value of the air detected by the gas-measuring device.

In another embodiment, the at least one means for generating light is at least one LEC luminous surface and/or at least one LED.

In an additional embodiment, the at least one means for generating sound is an electrical and/or electronic and/or electromechanical component for generating sound.

In an additional variant, the at least one means for generating light and/or the at least one means for generating sound and/or the at least one mechanical means is integrated, preferably nondetachably, in and/or on the material of which the safety clothing is manufactured, e.g., a fabric, textiles, leather and/or plastic.

In another embodiment, the at least one means for generating light and/or the at least one means for generating sound and/or the at least one mechanical means form a part of the safety clothing and occupies at least 5%, preferably at least 5% to 40% and especially at least 40% to 80% of the surface, especially of the surface that is visible during the wearing of the safety clothing.

The safety clothing preferably comprises a control and/or regulating unit for controlling and/or regulating the at least one means for generating light and/or the at least one means for generating sound and/or the mechanical means and/or the interface.

In another embodiment, the control and/or regulating unit can be supplied with power, especially electrical current, by the power supply means.

In particular, the safety clothing comprises at least one line for establishing an electrical connection between the at least one means for generating light and/or the at least one means for generating sound and/or the at least one mechanical means and/or the interface and/or the control and regulating unit and/or the power supply unit.

In an additional embodiment, the interface is a wireless interface and brings about especially the exchange of data or signals, for example, by means of an IR radio connection or a Bluetooth radio connection.

In one variant, the safety clothing comprises a mechanical adaptation for the preferably detachable fastening of the gas-measuring device to the safety clothing.

In particular, the safety clothing is a safety helmet or a safety belt or a safety vest.

The power supply means may advantageously be a battery in an additional embodiment.

The safety clothing preferably comprises a portable gas-measuring device.

In another variant, the gas-measuring device comprises at least one sensor for detecting the concentration of harmful substances and/or a data processing unit for processing the data detected by the at least one sensor and/or a control and/or regulating unit and/or a preferably optical display element and/or a gas-measuring device interface for exchanging data or signals with the interface arranged on the safety clothing.

A safety system for persons in dangerous situations for optically and/or acoustically and/or mechanically warning the person when at least one limit value of at least one dangerous gas is exceeded or in case of at least one implausible measured value of the air detected by the gas-measuring device comprises an above-described safety clothing and an especially stationary or quasistationary gas-measuring device, wherein data or signals can be exchanged between the gas-measuring device and the safety clothing for warning the person.

In another embodiment, the data or signals can be transmitted from a gas-measuring device interface to the interface.

In particular, the interface and/or the gas-measuring device interface are wireless or wired.

In one variant, the gas-measuring device is portable, i.e., can be carried, or is stationary or quasistationary.

The at least one mechanical means is preferably a vibrator.

In another embodiment, the safety clothing comprises a switch for switching on and off the at least one means for generating light and/or the at least one means for generating sound and/or the at least one mechanical means.

Two exemplary embodiments of the present invention will be described in more detail below with reference to the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
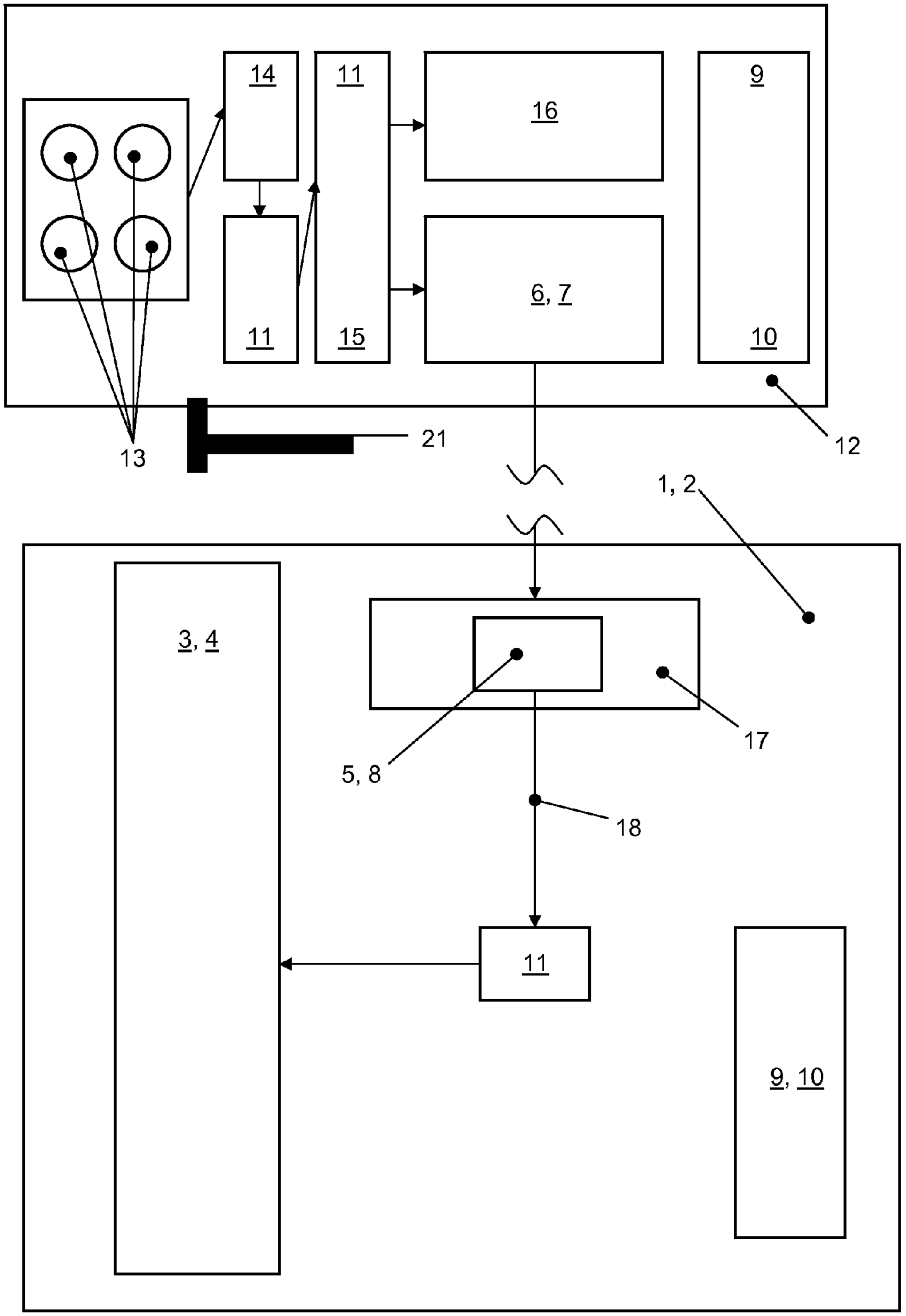
FIG. 1 is a block diagram of a safety belt with an LEC luminous surface and with a portable gas-measuring device for protecting persons in dangerous situations.

Referring to the drawings in particular, FIG. 1 shows a block diagram of safety clothing 1 with a clothing part designed as a safety belt 2 in the lower half of FIG. 1 and of a portable gas-measuring device 12 in the upper half of FIG. 1. The portable gas-measuring device 12 is attached to the safety belt 2. The gas-measuring device 12 comprises sensors 13 for measuring the concentration of harmful gases, e.g., toxic, explosive and/or combustible gases. The sensors 13 are connected by means of a signal processing unit 14 to a central control and regulating unit 11, which analyzes the measured gas concentrations by means of a program module 15, which is part of the control and regulating unit 11. The measured concentration of the harmful gas can thus be compared with preset limit values, and the person in the dangerous situation is warned if the limit value is exceeded. An optical display element 16, e.g., a lamp, indicates the exceeding of a limit value of the harmful gas at a housing (not shown) of the gas-measuring device 12. A gas-measuring device interface 6 of the gas-measuring device 12 is used as a transmitting unit 7 for sending a device generated warning signal to an interface 5 designed as a receiving unit 8 at the safety belt 2. The gas-measuring device 12 is fastened to the safety belt 2 by means of a mechanical adaptation or mechanical adaptor 21, e.g., a clip, said mechanical adaptation being designed such that devices of existing designs for portable gas-measuring devices 12 can be attached to the mechanical adaptation without modifications (not shown). The gas-measuring device interface 6 and interface 5 are, in general, wired, because both the gas-measuring device 12 with the gas-measuring device interface 6 and the interface 5 of the LEC luminous surface 4 are arranged at the safety belt 2 and transmission of the alarm signal via cable or wire is thus easily possible. Contrary to this, interface 5 and the gas-measuring device interface 6 may also be wireless or radio interfaces (not shown).

The receiving unit 8 is detachably attached to the safety belt 2 (FIGS. 1 and 3) by means of a mount 17. The safety belt 2 is provided with warning surface such as an LEC luminous surface 4 as a means 3 for generating light as a warning stimulus and with a control and regulating unit 11. The LEC luminous surface 4 as an electroluminescent surface is an active luminous surface, i.e., it generates light and has the property of providing high durability at a low power consumption. A phosphorus layer is arranged between a plurality of plastic layers and excited to light by means of high-frequency electrical voltage. Contrary to known reflecting materials, LEC luminous surfaces 4 do not rely on external supply sources of light because they emit light independently. LEC luminous surfaces 4 therefore have good visibility even under poor visibility conditions, e.g., in smoke, rain or fog. In addition, the emitted light of the LEC luminous surface 4 is not perceived by the user as being glaring or irritating, so that the person in a dangerous situation is not distracted. The LEC luminous surface 4 can be switched on and off by means of a switch, not shown.

The receiving unit 8, the control and regulating unit 11 and the LEC luminous surface are connected to one another by means of electrical lines 18. A warning signal received by the receiving unit 8 is sent by the electrical line 18 to the control and regulating unit 11. A power supply means 9 designed as a battery 10 supplies the receiving unit 8, the control and regulating unit 11 and the LEC luminous surface 4 with electrical current by means of electrical lines, not shown. When the alarm signal is received, a modulated electrical voltage is applied by the control and regulating unit 11 in the corresponding layers in the LEC luminous surface 4, so that the LEC luminous surface 4 emits light and the person is thus warned optically of a dangerous concentration of the harmful gas.

Figure 2:
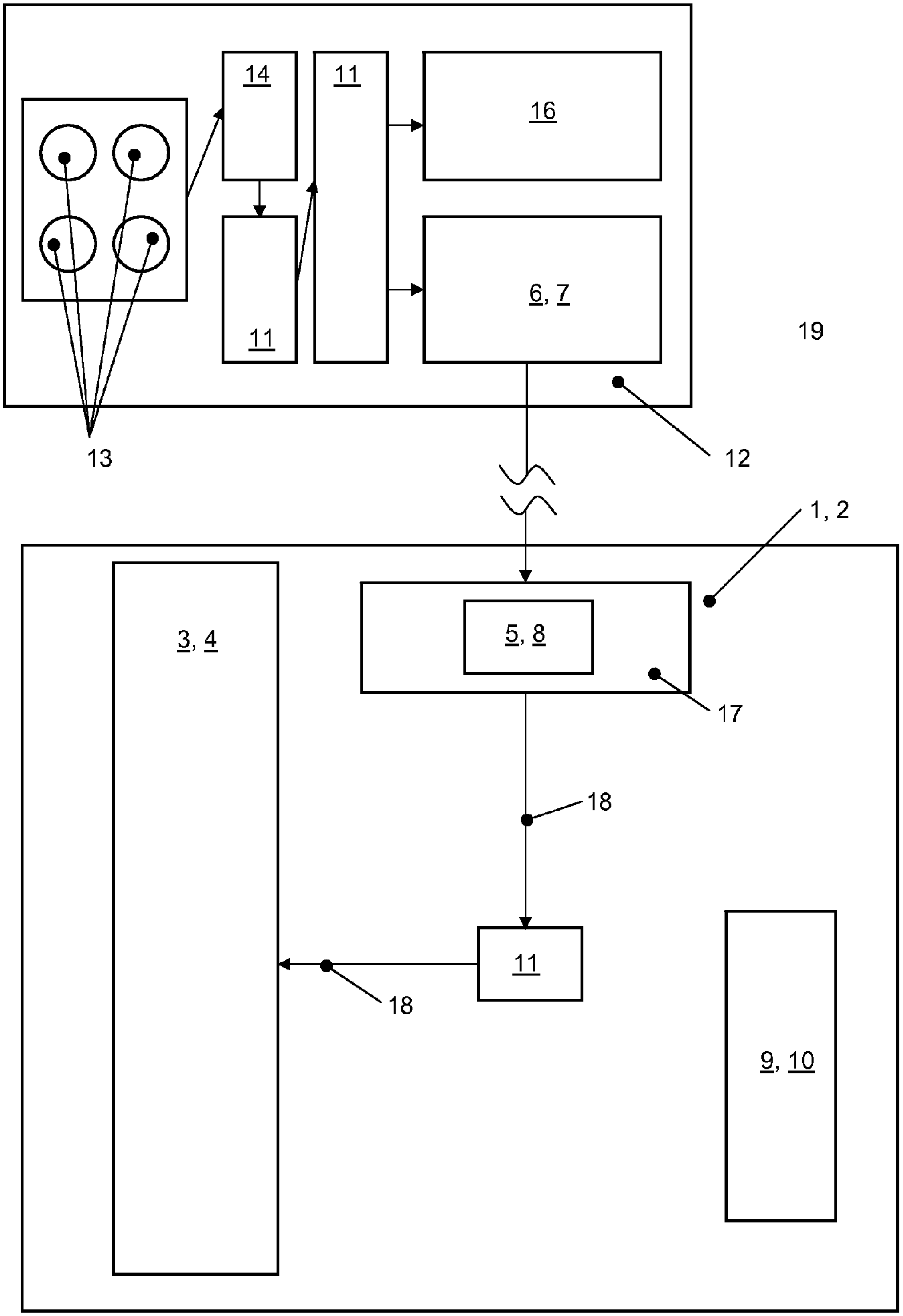
FIG. 2 is a block diagram of the safety belt with an LEC luminous surface and with a separate stationary gas-measuring device not arranged on the safety belt for protecting persons in dangerous situations.

FIG. 2 shows a safety system 19 for persons in dangerous situations with a safety belt 2 and with a stationary or quasistationary gas-measuring device 12. The design of the gas-measuring device 12 corresponds to that of the gas-measuring device 12 shown in FIG. 1 with the difference that it is not portable. The design of the safety belt 2 corresponds to that of the safety belt 2 shown in FIG. 1. The gas-measuring device interface 6 and interface 5 are, in general, wireless or radio interfaces, because the gas-measuring device 12 is stationary and the receiving unit 8 is carried by the user as a mobile unit on the safety belt 2. For example, an IR radio connection or a Bluetooth radio connection are considered here. A cable-connected gas-measuring device interface 5 and interface 6 are therefore difficult to embody. When the limit value of the harmful gas is exceeded, a warning signal is sent by the stationary transmitting unit 7 as a gas-measuring device interface 6 to the mobile receiving unit 8 as an interface 5 on the safety belt 2. The control and regulating unit 11 thereupon activates the LEC luminous surface 4, so that the user is warned.

Figure 3:
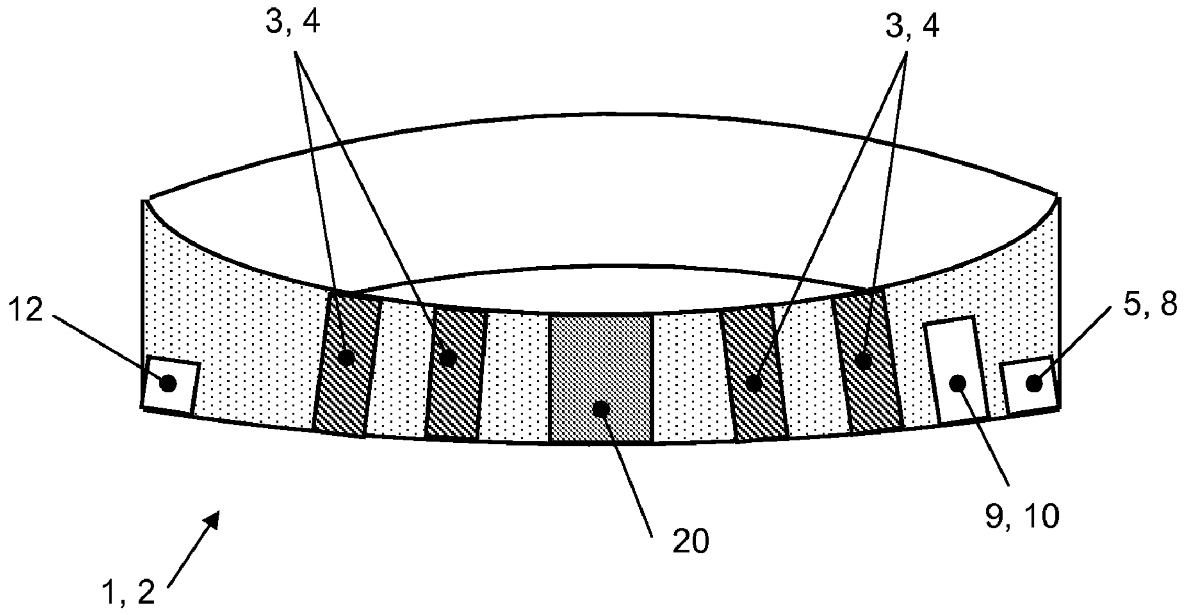
FIG. 3 is a perspective view of the safety belt according to FIG. 1.

FIG. 3 shows a perspective view of the safety belt 2, A plurality of warning surfaces in the form of LEC luminous surfaces 4 are arranged on the safety belt 2 with a buckle 20. Furthermore, the portable gas-measuring device 12, a battery 10 and an interface 5 designed as a receiving unit 8 are fixed to the safety belt 2. The control unit 11, likewise fastened to the safety belt 2, as well as the lines 18 are not shown in FIG. 3.

DE 10 2005 045 272 B4 and/or DE 101 40 945 B4 show another variant of the gas-measuring device 12. DE 10 2005 045 272 B4 and/or DE 101 40 945 B4 are therefore included in this patent application (and corresponding U.S. Pat. No. 7,336,191 and U.S. Pat. No. 6,728,643 are hereby incorporated by reference in their entirety), especially insofar as they are meaningful and/or compatible. The individual variants and/or exemplary embodiments can be combined with one another insofar as this is meaningful.

The optical warning stimulus, i.e., the light emitted by the LEC luminous surface 4, may have different colors and/or different light intensities and/or different blinking frequencies. Different colors and/or different light intensities and/or different blinking frequencies may have different meanings, for example, a device or battery alarm or different danger levels or different limit values for the same harmful gases or different harmful gases (not shown).

Another possibility of improving the safety of a person in a dangerous situation is to integrate a deadman switch in the safety clothing 1. One or more acceleration sensors, which trigger an optical alarm, i.e., the activation of the LEC luminous surface 4 by means of the control and regulating unit 11 after a predefined time without motion, are installed for this in and/or on the safety clothing. An unconscious user can thus be recognized and found in a short time (not shown).

On the whole, considerable advantages are associated with the safety clothing 1 according to the present invention. The user is warned of dangerous harmful gases in dangerous situations by an LEC luminous surface 4 integrated in the safety clothing 1. The LEC luminous surface 4 is therefore arranged in space very close to the person, so that the emitted light can be perceived even under very poor visibility conditions. Moreover, both portable and stationary gas-measuring devices 12 can be used, which activate the LEC luminous surface 4 in case of high concentrations of harmful gases.

While specific embodiments of the invention have been shown and described in detail to illustrate the application of the principles of the invention, it will be understood that the invention may be embodied otherwise without departing from such principles.

What is claimed is:

1. Safety clothing being worn by persons in dangerous situations, the safety clothing comprising:

a clothing part;

at least one of a light generating means for generating light and a sound generating means for generating sound and a mechanical warning means for generating a warning stimulus, which is part of the clothing part and is integrated into material of which the clothing part is manufactured and is perceptible to the person wearing the safety clothing;

an interface for exchanging data or signals with a gas-measuring device having a sensor, said interface being connected to the clothing part and said at least one of said light generating means, sound generating means and mechanical warning means and said interface being in functional connection; and a power supply means for supplying power to said at least one light generating means sound generating means and mechanical warning means and/or to said interface, which are in functional connection with one another, for optically and/or acoustically and/or mechanically warning the person when at least one limit value of at least one harmful gas is exceeded or in case of at least one implausible measured value of the air detected by the gas-measuring device.

2. Safety clothing in accordance with claim 1, wherein said light generating means is at least one LEC luminous surface and/or at least one LED.

3. Safety clothing in accordance with claim 1, wherein said light generating means occupies at least 5% to 80% of a safety clothing surface visible during the wearing of the safety clothing.

4. Safety clothing in accordance with claim 1, wherein said at least one light generating means, sound generating means and mechanical warning means is integrated essentially non-detachably in and/or on material forming said clothing part, said material comprising one or more of fabric, textiles, leather and plastic.

5. Safety clothing in accordance with claim 1, further comprising a control and/or regulating unit for controlling and/or regulating said at least one light generating means, sound generating means and mechanical warning means and/or said interface.

6. Safety clothing in accordance with claim 5, further comprising power supply means for supplying power to said control and/or regulating means.

7. Safety clothing in accordance with claim 6, further comprising a line for establishing an electrical connection between said at least one light generating means, sound generating means and mechanical warning means and/or said interface and/or said control and regulating means and/or the power supply means.

8. Safety clothing in accordance with claim 1, wherein said interface is a wireless interface and brings about an exchange of data or signals by means of a radio connection.

9. Safety clothing in accordance with claim 1, further comprising a mechanical adaptor for detachably fastening the gas-measuring device to the safety clothing.

10. Safety clothing in accordance with claim 1, wherein said clothing part comprises one of a safety helmet, safety belt and a safety vest.

11. Safety clothing in accordance with claim 6, wherein the power supply means is a battery.

12. Safety clothing in accordance with claim 1, wherein the portable gas-measuring device forms part of the safety clothing.

13. Safety clothing in accordance with claim 12, wherein said gas-measuring device comprises at least one sensor for detecting the concentration of harmful substances and/or a data processing unit for processing the data acquired by the at least one sensor and/or a control and/or regulating unit and/or a display element and/or a gas-measuring device interface for exchanging data or signals with said interface connected to said clothing part.

14. A safety system for persons in dangerous situations for optically and/or acoustically and/or mechanically warning the person when at least one limit valve of at least one harmful gas is exceeded or in case of at least one implausible detected measured value, the safety system comprising:

a stationary and/or quasistationary gas-measuring device; and safety clothing comprising a clothing part, at least one of a light generating means for generating light and a sound generating means for generating sound and a mechanical warning means for generating a warning stimulus, which is part of the clothing part and is integrated into material of which the clothing part is manufactured and is perceptible to the person wearing the safety clothing, an interface for exchanging data or signals with said gas-measuring device having a sensor, said interface being connected to the clothing part and said at least one of said light generating means, sound generating means and mechanical warning means and said interface being in functional connection, and a power supply means for supplying power to said at least one light generating means, sound generating means and mechanical warning means and/or to said interface, which are in functional connection with one another, for optically and/or acoustically and/or mechanically warning the person when at least one limit value of at least one harmful gas is exceeded or in case of at least one implausible measured value of the air detected by the gas-measuring device and whereby data or signals can be exchanged between said gas-measuring device and said safety clothing for warning the person of the air detected by a gas-measuring device.

15. A safety system in accordance with claim 14, wherein said gas-measuring device comprises at least one sensor for determining the concentration of harmful substances, a data processing unit for processing the data acquired by the at least one sensor and a control and regulating means and a gas-measuring device interface for exchanging data or signals with said interface arranged at the safety clothing.

16. A safety system in accordance with claim 14, wherein said gas-measuring device further comprises an optical display element.

* * * * *